May 7, 1946.  W. S. REARICK ET AL  2,399,759

MACHINE TOOL

Filed July 27, 1940  9 Sheets-Sheet 1

INVENTORS.
Walter S. Rearick &
George E. Nighthart
BY
S. Ernest Low.
ATTORNEY.

May 7, 1946.　　　W. S. REARICK ET AL　　　2,399,759
MACHINE TOOL
Filed July 27, 1940　　　9 Sheets-Sheet 3

INVENTORS.
Walter S. Rearick &
George E. Nighthart
ATTORNEY.

May 7, 1946.　　　　W. S. REARICK ET AL　　　　2,399,759
MACHINE TOOL
Filed July 27, 1940　　　　9 Sheets-Sheet 4

INVENTORS.
Walter S. Rearick &
George E. Nighthart
BY
S. Ernest Low
ATTORNEY.

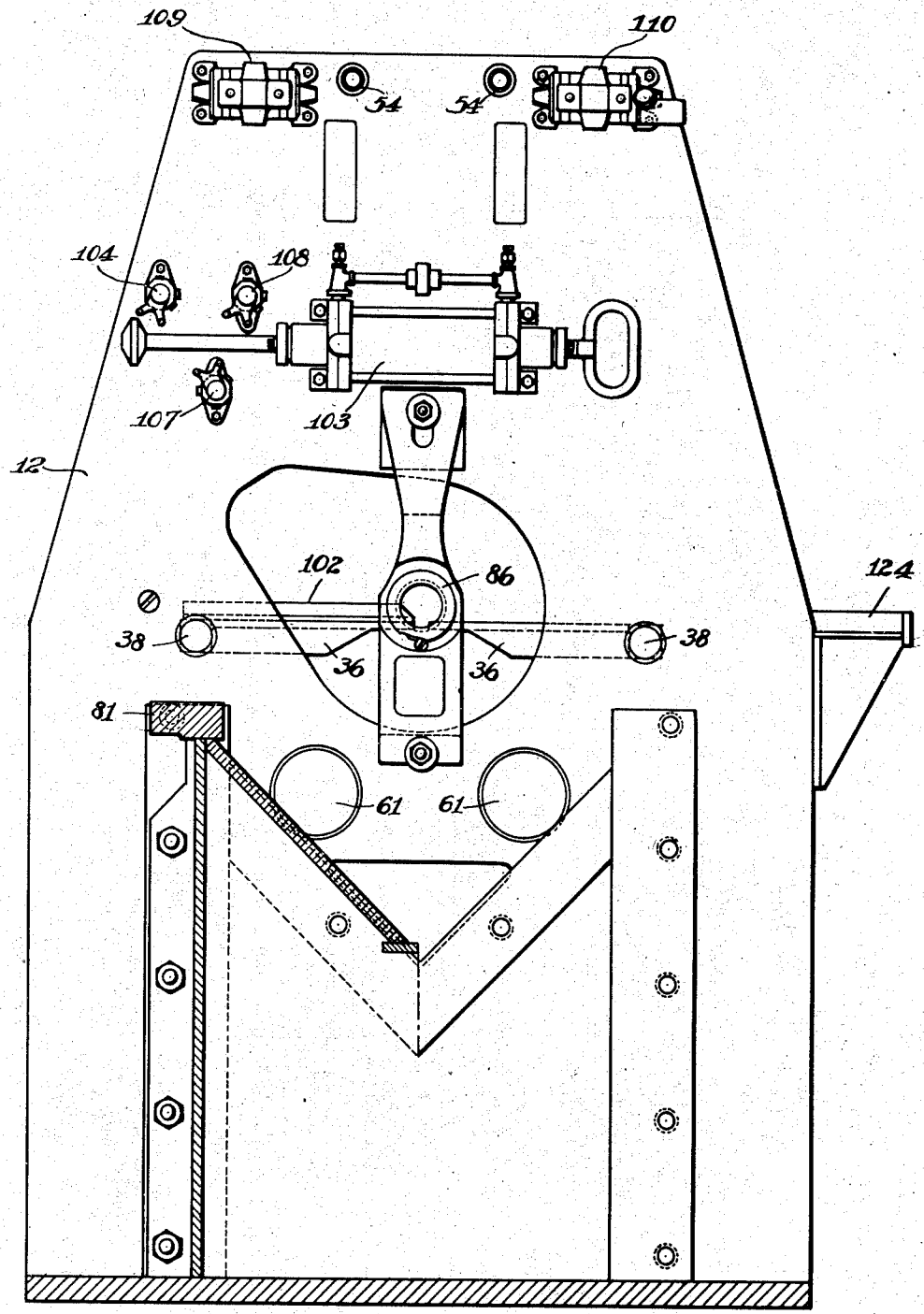

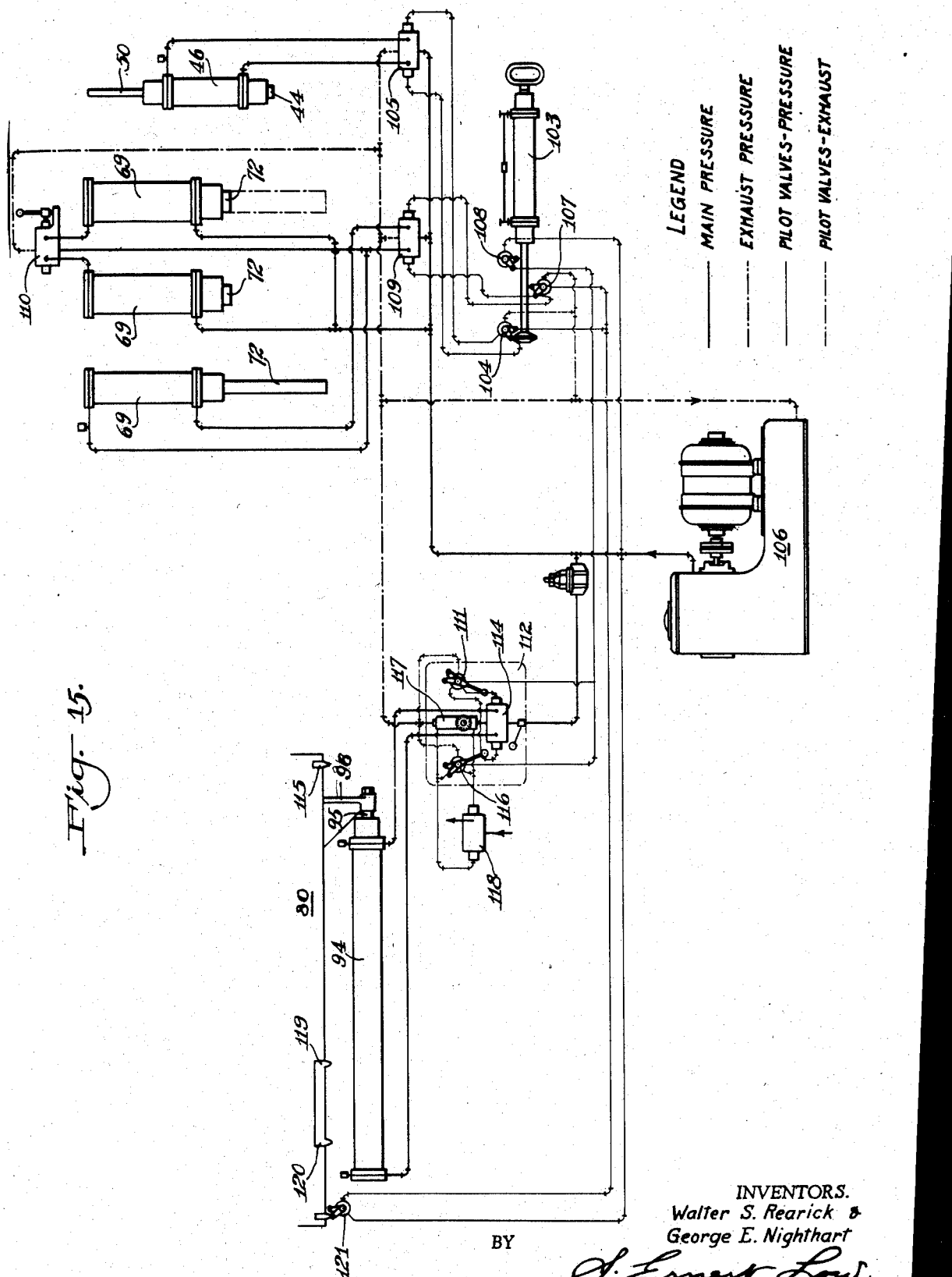

Patented May 7, 1946

2,399,759

UNITED STATES PATENT OFFICE 2,399,759

MACHINE TOOL

Walter S. Rearick and George E. Nighthart, New Kensington, Pa., assignors to Aluminum Company of America, Pittsburgh, Pa., a corporation of Pennsylvania Application July 27, 1940, Serial No. 347,912

14 Claims. (Cl. 77—5)

This invention relates in general to improvements in machine tools of the automatic and/or semi-automatic type. It is more specifically concerned with machine tools for performing drilling, boring, scalping, and like operations upon articles, objects, or work pieces in mass production sequence.

The invention is primarily directed to an improved machine tool, in combination with its associated work-handling instrumentalities, whereby the organized arrangement of the machine tool and its auxiliary work-handling mechanism permits coordinated sequence of operations in the charging, clamping, machining, and discharging of work pieces in the normal operation of the machine tool.

An object of the invention is to provide an improved mechanism for machining work pieces delivered to the mechanism of this invention in successive order.

A further object of the invention is to provide a loading means, in combination with a machine tool element, which serves to deliver a work piece into position for accurate registry with a machine tool element.

Another object of the invention is to provide a coordinated mechanism incorporating adjustable features in its construction permitting adaption of a machine tool to work pieces of varying size.

Other objects will present themselves following a consideration of the following description of a specific example of the invention, which has been illustrated in the drawings attached hereto, in which:

Fig. 12 represents an elevational view in partial section taken in the direction of the arrows XII—XII on Fig. 2;

Fig. 15 represents a diagrammatic legend drawing illustrating the coordinated valve arrangement incorporated in the mechanism of this invention.

Figure 1:
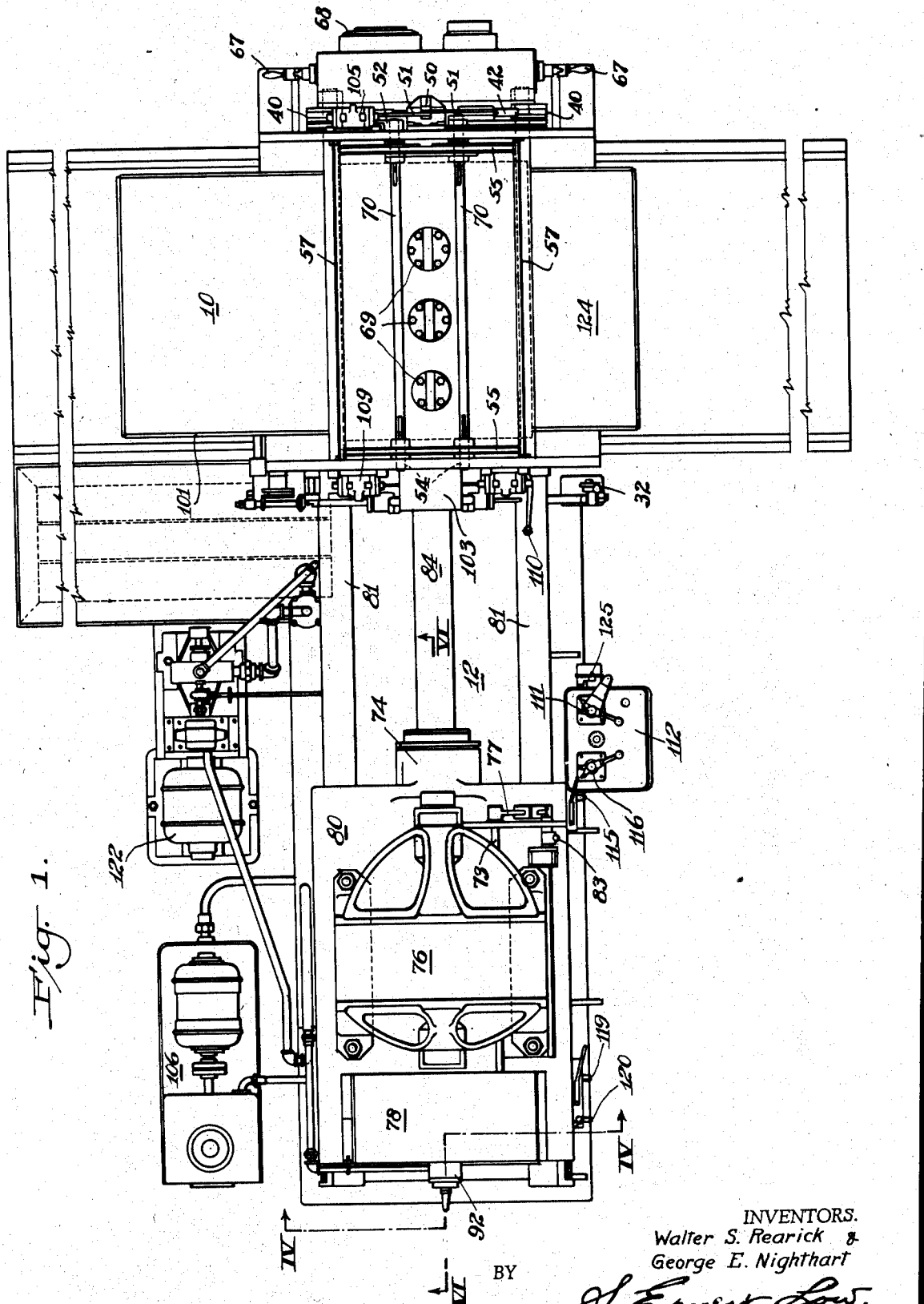
Fig. 1 represents a top plan view of a mechanism embodying the features of the invention.

It is to be understood that the apparatus or mechanism selected for the purpose of describing this invention is merely representative of a specific embodiment of the invention, and that numerous other mechanisms and embodiments incorporating the novel features of the herein illustrated mechanism will present themselves to one skilled in this art.

In general, the improved machine tool of this invention incorporates a work-loading means in the form of a suitable platform disposed adjacent a driven machine tool element in combination with means for releasing and delivering work pieces from the aforesaid platform into an intermediate position for having a subsequent working operation performed thereon, the work pieces being thereafter adapted to be delivered into final work-performing position where they are clamped in registry with the machine tool element. The delivery of work pieces from the aforementioned platform or supply station to the intermediate and final work-receiving positions or stations, followed by a clamping and machining operation, constitute a series of steps in a machine tooling operation which are carried out in proper sequence through automatic control devices incorporated in the mechanism of this invention. It will be manifest, then, that the operation of the improved machine tool of this invention is substantially entirely automatic, although its operation is not limited thereto, as will be apparent from a consideration of the following detailed description of the apparatus illustrated in the drawings accompanying this specification.

Referring now to the drawings, the mechanism is hereinafter described in terms of its various coordinated elements as follows.

Work-charging mechanism

As is more clearly illustrated in Figs. 1, 2, 3, 7, and 8, the work-loading, positioning, and clamping instrumentalities of the apparatus of this invention comprise a loading platform 10 which is adjustably supported adjacent one edge of the main frame 12 of the mechanism. The platform 10 is pivotally connected to the main frame 12 and link-supported through the medium of threaded link members 14 connected by means of suitable couplers or turnbuckles 15. It will be understood that this particular construction and mounting for table or platform 10 permit adjustment of the same from substantially horizontal to an inwardly sloping position, the purpose of which will hereinafter be more fully understood.

Projecting upwardly through the edge of the platform 10, nearest the central axis of the machine tool mechanism, are a series of stop members in the form of vertically disposed pins 16 (Figs. 3 and 7) which insure against any movement of work pieces supported upon platform 10 into the mechanism until such pins are withdrawn from their upwardly extending position. The pins 16 are shouldered at 17 and are vertically positioned and guided in suitably aligned apertures in the main frame 12 and table 10.

The shoulders 17, which may take the form of collars pin-secured to pins 16, are each engaged by the bifurcated ends of links 18 which are pin-secured to a shaft 19 rotatably mounted in suitable bearings carried by the main frame 12. The shaft 19 extends beyond the end of the main frame 12 (Fig. 7) and supports a crank arm 20 that is suitably secured to said shaft, as by a pin connection, in the same manner as arms or links 18. The crank arm 20 is loosely connected through a suitable slot and pin connection 22 to one end of a link 24, the opposite or lower end of which is suitably connected as at 25 to one end of a pull rod 26 extending through the base of the main frame 12 of the machine tool. The link 24 is provided adjacent its end, furthest removed from the pin and slot connection 22, with a roller 27 which is adapted to engage and roll over a guide plate 28 secured to the main frame 12. The opposite end of the pull rod 26 is connected at 30 intermediate the ends of a control lever 32. The control lever in turn is pivotally secured at its lower end at 34 to the main frame 12.

Figure 3:
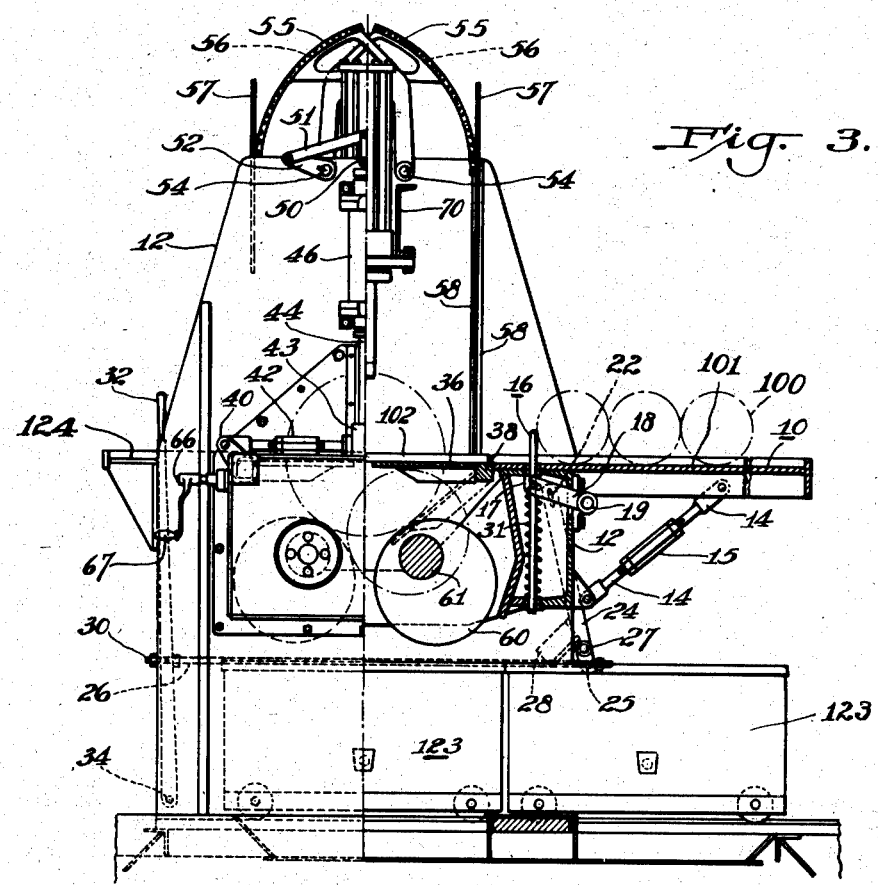
Fig. 3 represents an end elevational view in partial section of the mechanism of this invention, as viewed from the right of Figs. 1 and 2.
Figure 7:
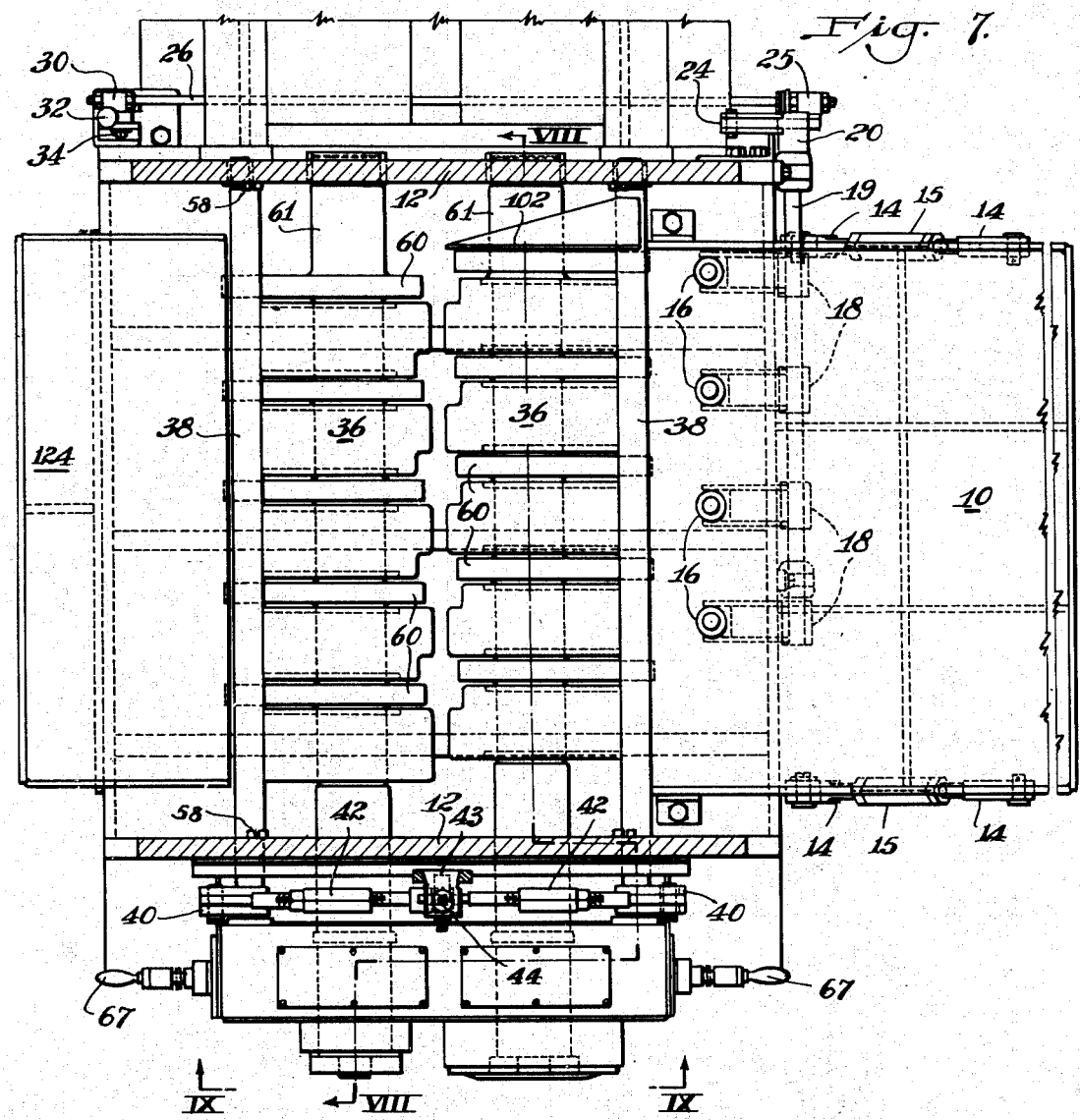
Fig. 7 represents an enlarged plan view in partial section, taken in the direction of the arrows VII—VII on Fig. 2.

It will be seen that oscillatory movement of the control lever 32 outwardly to the left, as viewed from its position illustrated in Figs. 3 and 7, will actuate pull rod 26, link 24, and crank 20 to rotate shaft 19 in a counterclockwise direction. The rotation of shaft 19 likewise oscillates the bifurcated links or arms 18 to downwardly withdraw stop pins 16 below the level of platform 10. A coiled spring 31 surrounding each of the pins 16, and disposed between shoulders 17 and the main frame 12, is of sufficient strength to return the pins 16, associated linkage, and control lever 32 to stop position, as indicated in Figs. 3 and 7.

Initial work-receiving station

In the normal sequence of operations of the machine tool of this invention, the position occupied by a work piece following its delivery from the work platform or table 10 is defined in terms of an initial or intermediate work-receiving station.

Figure 8:
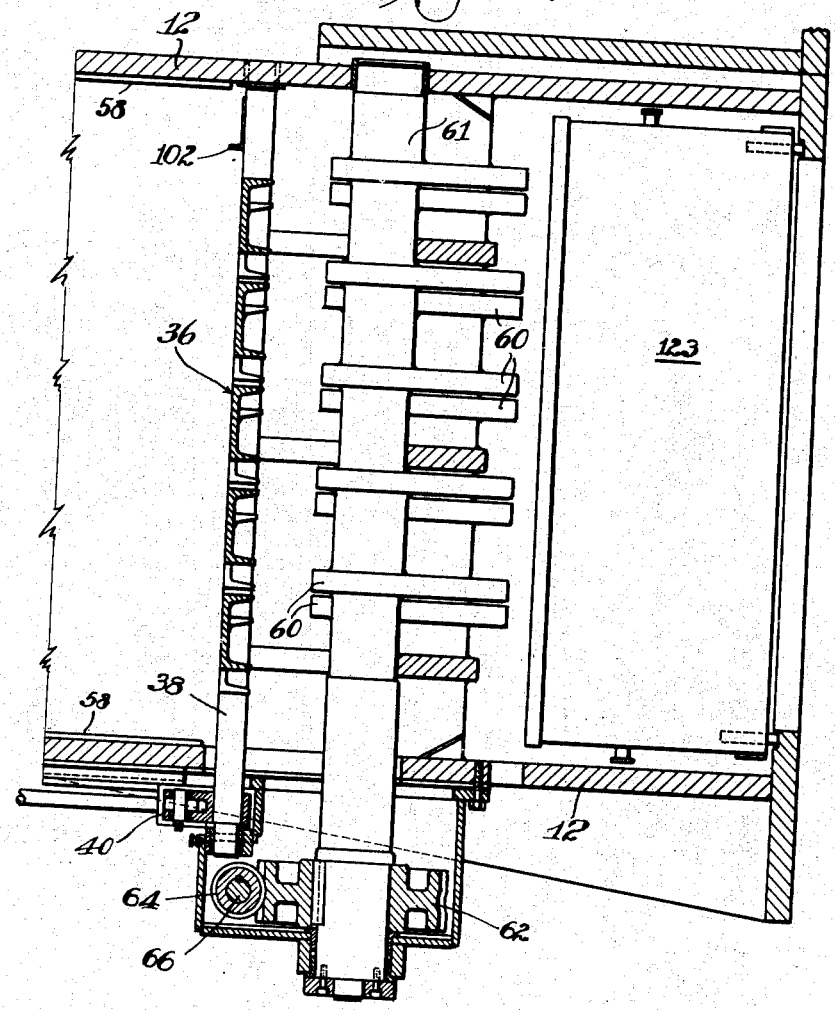
Fig. 8 represents a sectional elevation taken along the line VIII—VIII of Fig. 7.

The initial work-receiving station is immediately adjacent the aforedescribed platform 10 and comprises a pair of oscillatably mounted members in the form of fingers 36 supported on suitable shaft members 38 illustrated to best advantage in Figs. 7 and 8. The shaft members 38 are suitably journalled at their ends in the main frame 12 and carry secured thereto the aforementioned fingers 36 which are supported in cantilever spaced relationship. It will be noted that the cantilever-supported fingers 36 serve in the capacity of, and constitute, a trap door arrangement.

Figure 11:
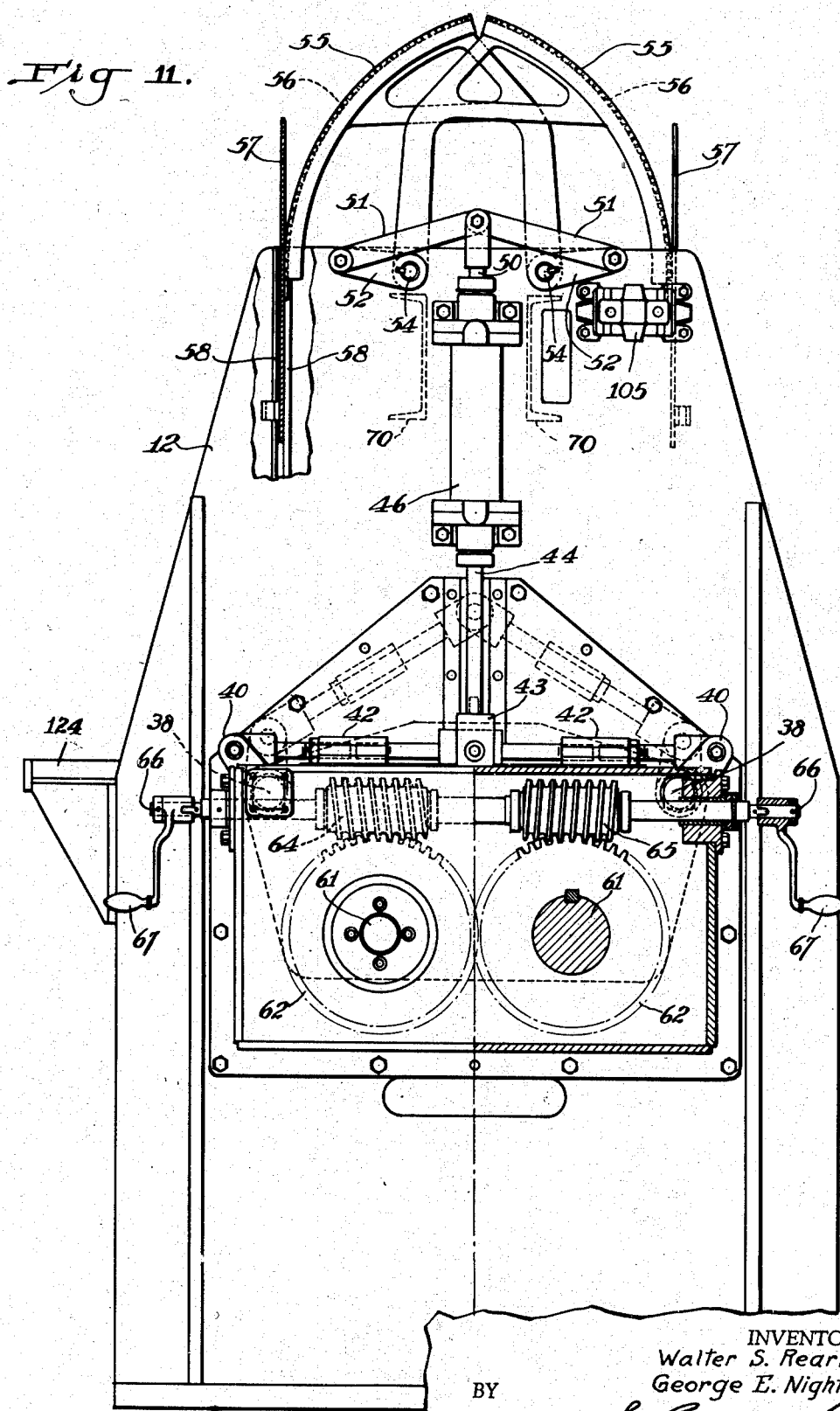
Fig. 11 represents an end elevation to enlarged scale, taken in the direction of the arrows XI—XI on Fig. 2, with parts broken away to more clearly illustrate in section the mode of construction of the mechanism of this invention.

Bifurcated crank arms 40 are secured to the same end of each of the shaft members 38 where these shafts extend through the end of the main housing member 12 (Figs. 7, 8, and 11). The crank arms 40 are connected through suitable adjustable linkages 42 to a centrally located cross-head member 43, the cross-head member being slidably mounted for vertical reciprocatory motion upon the exterior end surface of frame 12 (Fig. 11).

Cross-head member 43 is connected to a piston rod 44 extending downwardly from a piston within a cylinder 46 suitably connected to the main frame 12. It will be understood that reciprocation of piston rod 44 will likewise reciprocate cross-head member 43 to actuate linkages 42 and cranks 40 as a toggle mechanism. This toggle mechanism, as illustrated in full line construction in Fig. 11, serves to support the aforedescribed trap door arrangement incorporating fingers 36 in a substantially horizontal plane, substantially co-planar with the adjacent edge of platform 10. It will thus be seen that a work piece removed from platform 10 on withdrawal of stop pins 16 may be translated directly to the trap door fingers 36.

The cylinder 46 is also provided with an upwardly extending piston rod 50 which serves as the motivating force for a second toggle mechanism. This second toggle mechanism comprises a pair of like link members 51 connected at their ends, opposite to their connection to the piston rod 50, to similar crank arms 52. The crank arms 52 are keyed to like shafts 54 which extend through the main frame 12, wherein they are suitably journalled. Also key-connected to the shaft members 54 adjacent both ends thereof are door-operating members in the form of sectors 55 which serve as guides for chain members 56 attached at one end to splash door members 57, and at their opposite end to the upper ends of the sectors 55. The doors 57 are suitably guided in guides 58 for vertical reciprocatory movement within the main frame 12. It will be seen from the full line construction of Fig. 11 that piston rod 50 is retracted within its cylinder 46 when piston rod 44 is in its lowered position. In its retracted position, piston rod 50 functions to actuate the second toggle mechanism, comprising links 51, cranks 52, and sectors 55, to raise splash doors 57. It is to be further noted that when the splash doors 57 are in their raised or open position, the trap doors incorporating fingers 36 are likewise in their substantially horizontal or intermediate work-receiving position.

Final work-receiving station

A work piece having been delivered from the table 10 upon fingers 36 in their substantially horizontal position, as illustrated in Figs. 3, 7, 8, and 11, the next step in the sequence of operations pertaining to the machine tool of this invention comprises delivering a work piece to its final station or position, and clamping the same in that position.

The final work-receiving station comprises adjustable work-supporting members, preferably in the form of a plurality of eccentrics 60, keyed or otherwise secured to oppositely disposed, horizontal shaft members 61 journalled in the main frame 12 directly below the aforedescribed fingers 36. On particular reference to Figs. 10 and 11, it will be noted that shafts 61 are equipped at one end with suitable intermeshing helical gears 62. Suitable right and left-hand worms 64 and 65, respectively, are supported in mesh with helical gears 62 upon a continuous through-shaft 66 journalled immediately above helical gears 62. A crank handle 67 on each end of shaft 66 is provided for the purpose of manually rotating shafts 61 through the positive drive afforded by intermeshing helical gears 62 and worms 64—65. In this connection, it will be noted that shafts 61 are simultaneously rotated regardless of which crank 67 may be rotated. It will be further recognized that simultaneous rotary adjustment of shafts 61 likewise simultaneously adjusts the position of eccentrics 60 to raise or lower the surface presented by these cooperating eccentrics 60.

The eccentrics 60 are purposely mounted in spaced relationship on shafts 61, their spacing being such that the aforedescribed fingers 36, constituting the trap door arrangement for supporting a work piece in its preliminary or intermediate position within the machine tool of this invention, may be oscillated downwardly between the eccentrics, exposing the latter in a manner to receive and support the work piece initially carried or supported by the fingers 36.

Figure 9:
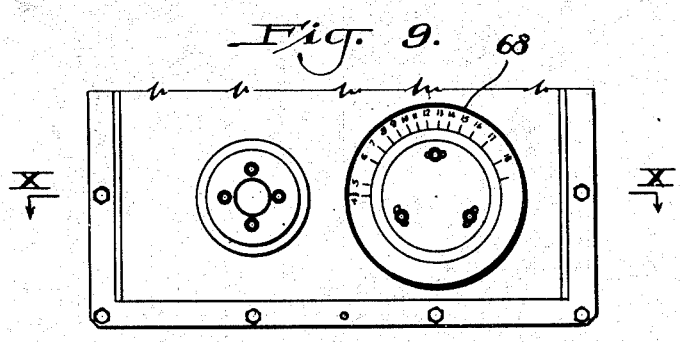
Fig. 9 represents a fragmentary end view taken in the direction of the arrows IX—IX on Fig. 7.
Figure 10:
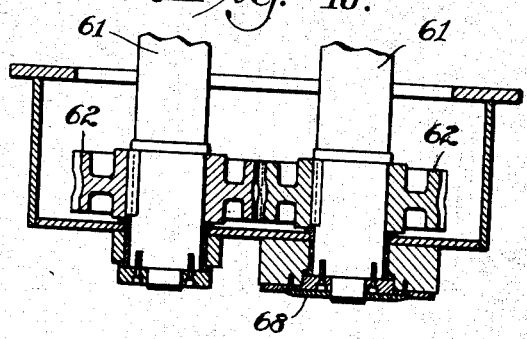
Fig. 10 represents a sectional view taken along the line X—X of Fig. 9.

By reference to Figs. 9 and 10, an indicator or dial mechanism will be seen which permits accurate and ready adjustment of the eccentrics 60 to accommodate varying sizes of work pieces. The indicator mechanism comprises a dial 68 secured to one of the eccentric-carrying shafts 61. This dial is preferably graduated in diameters of billets in inches, although it will be apparent that any other suitable unit of measurement of work piece could be satisfactorily employed. Rotation of either crank 67 permits simultaneous rotation of shafts 61 any desired amount as indicated by the dial 68, whereby a definite adjustment of eccentrics 60 may be acquired.

In the specific mechanism selected for illustration and description of the present invention, eccentrics 60 are adjustable to accommodate cylindrical billets ranging from a minimum diameter of 4½ inches up to and including a maximum diameter of 18⅝ inches. By reference to Fig. 3, it will be noted that one eccentric 60 is illustrated in full outline in position to receive and support a billet of maximum diameter. The eccentric is also illustrated in dot-and-dash outline in position to receive and support a billet of minimum diameter.

Work-clamping mechanism

Figure 2:
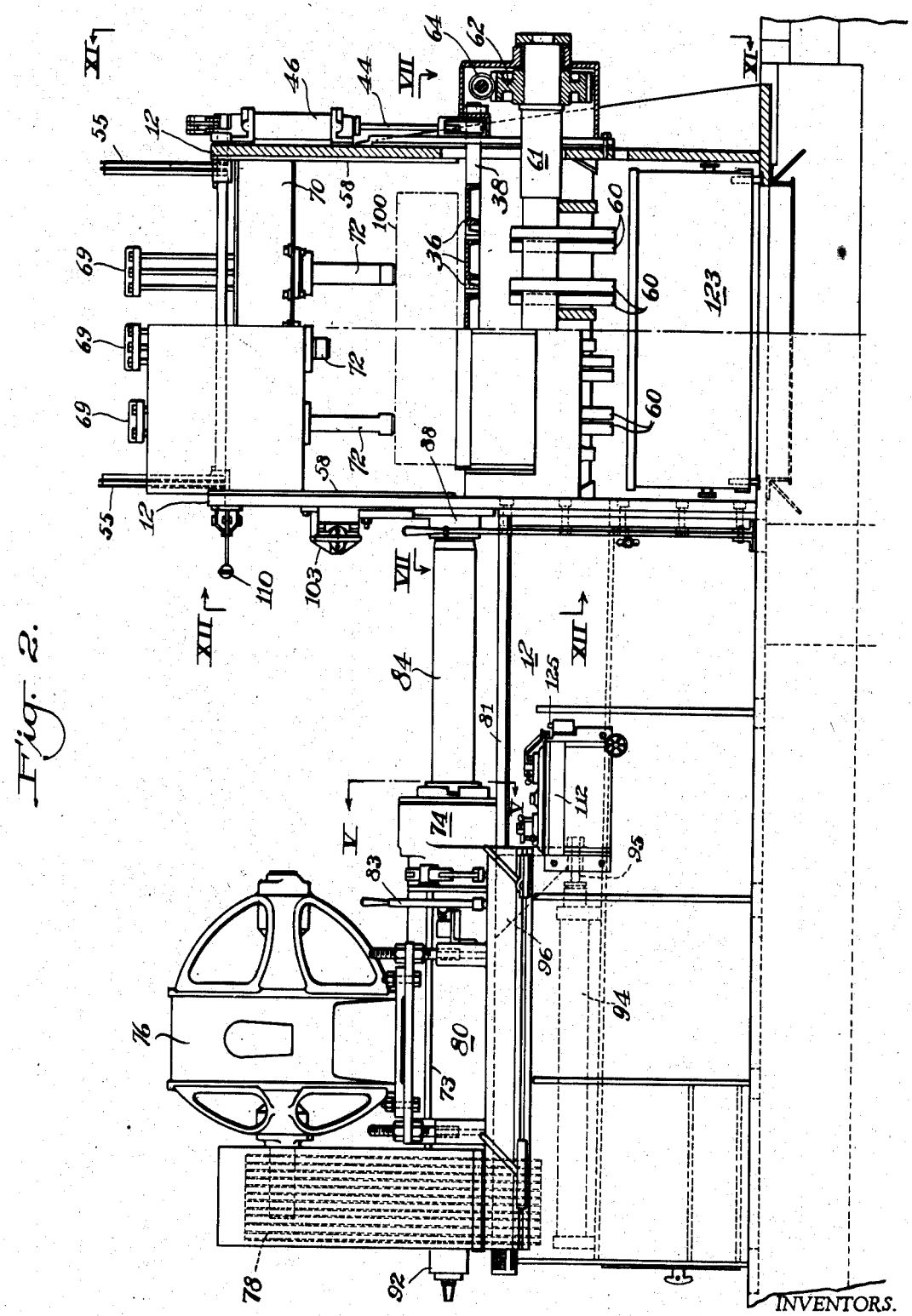
Fig. 2 represents a side elevation in partial section of the mechanism illustrated in Fig. 1.

A work piece having been deposited upon the cooperating eccentrics 60, following the operation of cylinder 46 to raise piston rod 44 and its associated toggle mechanism into the dotted position illustrated in Fig. 11 to lower fingers 36, it is now essential to positively clamp the work piece prior to the performance of a subsequent working operation thereon. The clamping mechanism comprises a plurality of pressure cylinders 69, preferably three as illustrated in Fig. 2 of the drawings, which are secured to a pair of oppositely disposed girder members 70 suitably secured to the main frame 12 immediately above the fingers 36 and eccentrics 60. The cylinders 69 are incorporated in the pressure system to be hereinafter described in more detail, in such a manner that one or more of their piston rods 72 may be advanced into clamping relationship with a work piece supported upon the cooperating eccentrics 60.

Tool assembly

No particular machining operation has been referred to hereinbefore in the description of the mechanism of this invention. For purposes of making a complete and adequate description of the invention, it has been elected to disclose the same in its adaptability and association with a drill, boring, and/or scalping tool for performing machining operations upon the interior surfaces of billets, ingots, or the like. In the specific illustrations and in the specific description to be related hereinafter, the mechanism of this invention is described in terms of its adaptability to work-performing operations upon cylindrical extrusion billets, whether these billets be solid in cross-section or initially provided with a tubular aperture extending throughout their length.

Figure 6:
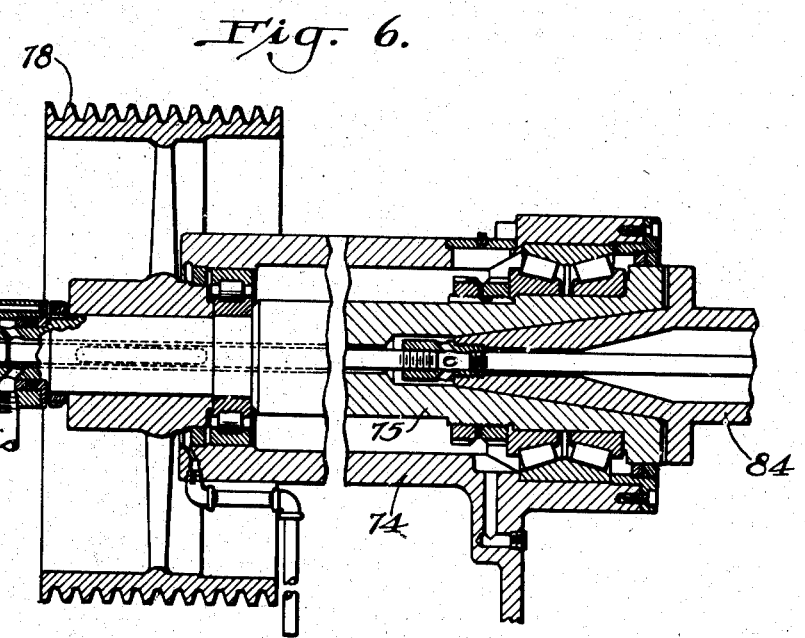
Fig. 6 represents a sectional view to enlarged scale, taken along the line VI—VI of Fig. 1.

By specific reference to Fig. 6, it will be noted that a sectional view has been taken through the tool spindle of the mechanism of this invention. The tool spindle essentially comprises a tubular housing 74 within which is supported a tubular torque shaft 75 suitably mounted in roller bearings within the aforementioned housing 74. Shaft 75 is driven by means of direct connection with a motor 76 (Fig. 2), preferably through the medium of a V-belt drive 78. The aforedescribed tool spindle and motor drive therefore constitute a reciprocatory tool carriage 80 which is slidingly mounted upon ways 81 forming a part of the main frame 12 of the improved machine tool of this invention.

Figure 14:
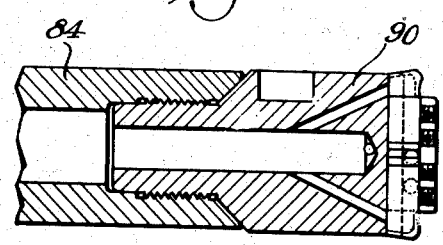
Fig. 14 represents a boring tool in operative assembly with a portion of the machine tool mechanism of this invention.
Figure 13:
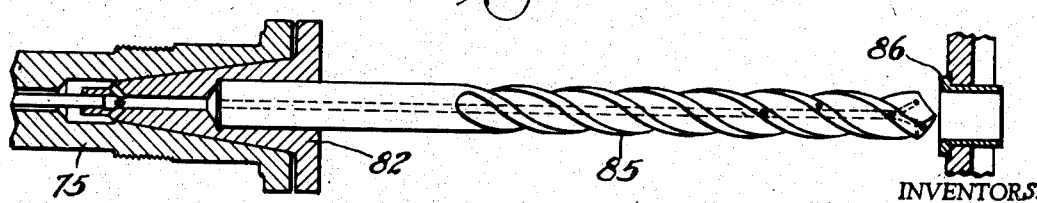
Fig. 13 represents a drill in operative assembly with a portion of the machine tool mechanism of this invention.

Any desired type of tool may be inserted within the tubular torque shaft 75, as will be more fully appreciated on reference to Figs. 13 and 14. For example, in Fig. 13 an adapter member 82 has been substituted for a boring bar 84 within the conical seat of torque shaft 75. This adapter 82 securely supports a drill 85 which on reciprocation of carriage 80 towards the right, as viewed in Figs. 1 and 2, advances through a suitable tool-centering bushing 86 supported on the main frame 12. The bushing 86 serves as a steady rest during translation of the drill 85 through a work piece secured in position by the aforedescribed eccentrics 60 and piston rods 72.

On reference to Fig. 14, the boring bar 84 of Figs. 1, 2, and 6 is illustrated in more detail and comprises a boring tool or cutter 90 threadedly engaged within the forwardly extending end of the boring bar 84. As in the case of the drill 85, the boring bar 84 would likewise be centered by means of a bushing 88 adjacent the main frame 12 to serve as a steady rest therefor.

Regardless of the type of tool employed in association with the tool carriage 80, it is preferred to internally cool and/or lubricate the tool. This is accomplished by supplying suitable coolant through the tubular passage in the interior of the torque shaft 75 and through suitable interiorly drilled apertures in tools 84, 85, and 90. For introducing the coolant to the interior of shaft 75 and providing a seal against leakage of the coolant because of normal rotation of shaft 75, a suitable seal 92 is provided on the extreme end of shaft 75 (Fig. 6) whereby coolant may be forced under pressure through the entrance tube 93 into the interior of shaft 75 and the particular tool operatively connected therewith, from where it is eventually discharged adjacent that portion of the tool engaged in a machining or work-performing operation.

To insure and provide for facile and rapid insertion and replacement of various tools within the tool shaft 75 a brake device is incorporated in the mechanism of the present invention. The brake device is illustrated to best advantage in Figs. 2, 4, and 5, and comprises a suitable brake shoe 71 secured, as by a key, to a shaft 73 suitably journalled within a portion of the frame of tool carriage 80. Brake shoe 71 is disposed adjacent the inner surface of the V-grooved pulley 78 secured to shaft 75. Through a suitable bell crank 77, secured to shaft 73, linkage 79 and control lever 83, brake shoe 71 is operable into and out of braking relationship with V-grooved pulley 78 to secure shaft 75 against rotation, whereby tools 84, 85, and 90 may be inserted within or removed from threaded or friction engagement with shaft 75.

Figure 4:
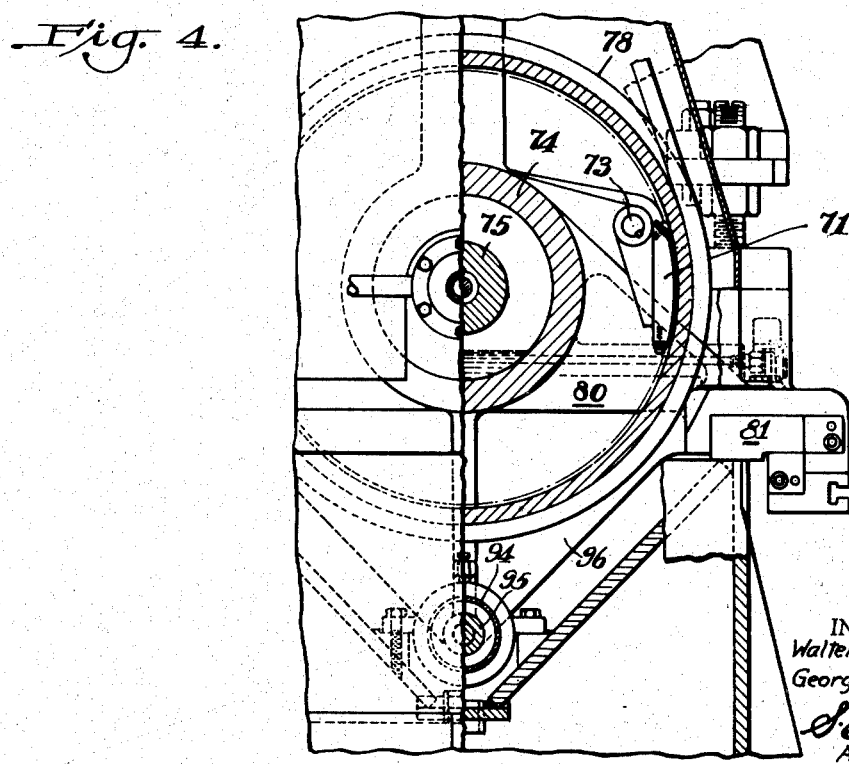
Fig. 4 represents a fragmentary elevation in partial section to enlarged scale, taken in the direction of the arrows IV—IV on Fig. 1.
Figure 5:
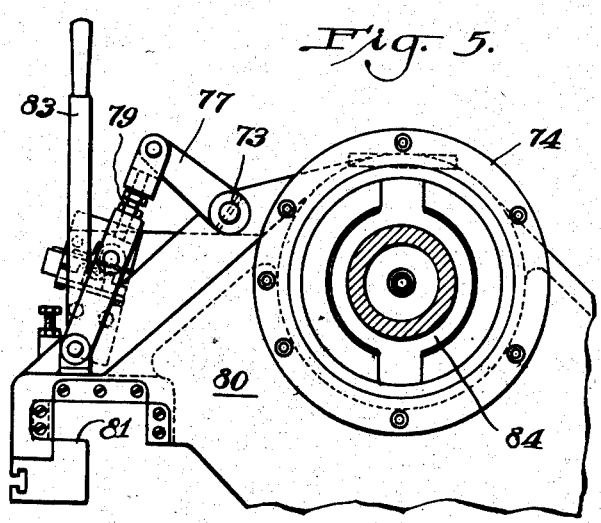
Fig. 5 represents a fragmentary elevation to the same scale as Fig. 4, taken in the direction of the arrows V—V on Fig. 2.

For advancing the tool carriage 80 towards a work piece in the performance of a machining operation, and to likewise retract the tool carriage and its supported tool following the completion of a machining operation, means are incorporated within the mechanism of this invention in the form of a double-acting pressure cylinder 94 secured within the main base 12 below the tool carriage 80. The piston rod 95 of a piston within cylinder 94 is suitably connected to a depending bracket or flange 96 formed integral or otherwise attached to the under side of carriage 80 (Figs. 2 and 4).

Operation

The operation of the machine tool mechanism of this invention will now be described in terms of its use as a billet-drilling and/or boring or scalping mechanism. In a drilling operation it is usual to charge the mechanism with solid metal billets, whereas in a boring or scalping operation the billets charged to the machine have normally been previously provided with a tubular aperture extending throughout their length. Cylindrical, or substantially cylindrical, billets have been selected for the purpose of this description, but this should not be taken in any sense as a limitation with respect to the adaptability or use of the machine tool of this invention. One skilled in this art will readily recognize the broad application of the invention to numerous other types of objects and work pieces regardless of their shape or cross-sectional form, and it is with this understanding that the invention described and illustrated herein should be considered.

In the operation of the mechanism of this invention a series or plurality of billets 100 are delivered or charged upon the platform 10 (Fig. 3). The billets may be manually charged on platform 10 or conveyed thereto from a previous casting or length-cutting operation by means of an endless conveyor, not shown. The billets are preferably guided onto platform 10 in such a manner that one end thereof is in substantial abutment with the upstanding edge 101 on platform 10.

Platform 10 is preferably adjusted through manipulation of threaded rods 14 and turnbuckles or couplers 15 to impart a slight forward pitch or slope to its top surface in a direction towards the machine tool proper. This slope is particularly significant when the machine is being used in the performance of working operations on generally cylindrical billets, which will gravitationally roll off the platform on withdrawal of stop pins 16. However, even if substantially rectangular work pieces are to be machined, a mechanical pusher (not shown) or other suitable feeding mechanism may be incorporated with the machine tool of this invention with equivalent satisfactory results.

Forward movement of control lever 32 (in a counter-clockwise direction as viewed in Fig. 3) withdraws stop pins 16 and permits the first billet 100 in contact therewith to roll onto the fingers 36 constituting the aforedescribed trap door-supporting mechanism. In this connection, splash doors 57 are in raised or open position when fingers 36 are in raised or substantially horizontal billet-receiving position. The fingers 36 may be slightly inclined inwardly toward the central axis of the machine tool element to form a substantially V-shaped trough for roughly centering a billet as delivered from platform 10. Also an end guide in the form of a flanged finger 102 is preferably mounted upon shaft 38 nearest platform 10 for guiding and aligning the end surface of a billet supported upon fingers 36.

Following the release of a billet, by the operation of control lever 32 and its associated stop pins 16, the pins 16 automatically return to stop position under the influence of springs 31, and thereby serve to retain the remaining billets 100 upon platform 10 until lever 32 is again actuated to withdraw pins 16.

The following steps in the operation of the machine tool of this invention are completely automatic, and particular reference is now made to Fig. 15 for a description and explanation thereof. A billet 100 having been delivered upon fingers 36, an operator pulls the handle of valve 103, thereby first opening pilot valve 104 which functions to open control valve 105 to the main pressure line of high-pressure motor-driven pump unit 106. Control valve 105 is installed in the main pressure circuit with cylinder 46, which cylinder now functions to raise its piston rods 44 and 50, whereby fingers 36 and splash doors 57 are both lowered. The lowering of fingers 36 places or delivers the billet 100 upon the eccentric supports 60, which have been previously adjusted to proper position to align a billet or work piece with the particular tool element (85 or 90) mounted in the tool spindle 75.

Continued outward pulling movement of the control handle of valve 103 next operates pilot valves 107 and 108 in delayed manner, whereby pilot valve 107 actuates control valve 109 to cut clamping cylinders 69 (Figs. 2 and 15) into the main pressure line from pressure unit 106, depending upon the position of switch valve 110. In this connection, switch valve 110 has three operating positions: first, to control main pressure to extreme left-hand cylinder 69 to lower its clamping rod 72; second, to control main pressure to first and second cylinders 69 (counting from left in Figs. 2 and 15) to lower their clamping rods 72; and third, to control main pressure to first and third cylinders 69 to lower their clamping rods 72. By proper selection of cylinders 69, through the medium of valve 110, any suitable combination of clamping pistons 72 may be brought into clamping relationship with a billet 100. By this arrangement of cylinders 69 and the selective control valve 110, various lengths of billets may be accommodated.

Pilot valve 108 now functions. This pilot valve is in circuit with a valve 111 on the tool carriage control panel 112 (Figs. 1 and 15). Valve 111, following the operation of pilot valve 108, may now be manually shifted to the right, as viewed in Fig. 15, to cut valve 114 and cylinder 94 into the main pressure line, thereby causing rapid traverse of tool carriage 80 to the right as viewed in Figs. 1 and 2. By proper positioning of cam 115 on the reciprocatory tool carriage 80, valve 116 is engaged by cam 115 and is shifted to tool feed position. Movement of tool carriage 80 throws an electric contact switch 125 in the circuit of motor 76 which serves to rotate tool shaft 75 and its supported tool. The shifting of valve 116 actuates an interassociated and interlocked feed adjustment valve 117 which serves to meter the flow of pressure fluid from the exhaust side of cylinder 94, thereby resulting in a controlled feed speed of tool carriage 80 and its supported tool element. Proper adjustable positioning of cam 119 on carriage 80 causes this cam to reverse valve 111 at the end of a feed stroke of tool carriage 80 to interrupt further movement of carriage 80 to the right. It will be appreciated that cam 119 may be set for any length of machining operation. It will also be understood that the tool feed speed is greatly reduced from that of the initial traverse speed of carriage 80 towards the work piece 100. Operation of feed control valve 116 also serves to open a coolant valve 118, the purpose of which will be hereinafter described.

When the tool (85 or 90) has travelled through a billet 100, feed valve 116 is reversed through the medium of adjustable cam 120 carried on the tool carriage 80. This reversal of valve 116 permits exhaust fluid pressure to by-pass valve 117 and permits rapid return of the tool carriage 80. Reversal of valve 116 also closes the aforementioned coolant valve 118. At the extreme left or returned position of tool carriage 80, the carriage contacts with pilot shut-off valve 121, whereby the subsequent operations of unclamping a billet may be performed.

Unclamping of a machined billet or work piece is accomplished by manually pushing inwardly on the control handle of cylinder 103, which action serves to close pilot valve 108 and reverse pilot valve 107. The closing of valve 108 shuts off pressure to valves 111 and 116 and the reversal of valve 107 serves to actuate valve 109 to raise clamping pistons 72 within cylinders 69. Continued inward movement of control handle of cylinder 103 serves to actuate pilot valve 104 to reverse control valve 105, whereby pistons 44 and 50 of cylinder 46 are lowered with subsequent raising of splash doors 57 and trap doors comprising fingers 36. The machined billet 100 may now be withdrawn from supporting fingers 36 onto the discharge platform 124 (Fig. 1) from where it may be transferred, as by endless conveyor (not shown) to storage or position for subsequent use.

The machine tool is now in condition and its associated parts so arranged that the subsequent work piece or billet 100 now in contact with stop pins 16 may be delivered to the machine tool proper for performance of a working operation thereon in accordance with the previously described cycle of operations.

During a machining operation as above described, valve 118 has been actuated to permit the flow of a suitable coolant from the high-pressure coolant unit 122 through the interior of tool spindle 75 and its associated tools (85 or 90). Splash doors 57 serve to deflect discharged coolant downwardly, and the coolant generally serves to flush chips or tool cuttings from the interior of the billet 100 where they are collected beneath the machine tool in a suitable buggy or truck 123. The buggy 123 is preferably provided with a foraminous bottom in order that the coolant may drain into a suitable sump disposed in the foundation of the mechanism. The coolant recovered in this sump is properly filtered and withdrawn therefrom by the high-pressure coolant unit 122 in its normal operation.

While the invention has been described with reference to a particular machining operation and is particularly adapted for association and coordination with drilling, boring, and/or scalping operations or the like, it is nevertheless to be understood that the invention will have numerous applications in other types of machining operations wherein work pieces are to be manipulated in a continuous manner.

The claims appended hereto are to be considered expressive of the novel features and arrangement of parts forming the present invention, it being understood that various modifications may be made in the preferred embodiment of the invention herein illustrated and described without departing from the general nature and scope of the invention.

What is claimed is:

1. In a machine tool for performing an interior machining operation upon work pieces, in combination, means for delivering a work piece to an intermediate station, means including hingedly mounted fingers for supporting said work piece at said intermediate station, means for withdrawing said supporting means whereby the work piece is lowered to a work-performing station, means for clamping said work piece at said last-mentioned station, and a tool adapted to be fed into the interior of said work piece in its clamped position.

2. In a machine tool mechanism, in combination, hingedly mounted means for supporting a work piece above a station at which a working operation is to be performed thereon, means for oscillating said work-supporting means downwardly whereby said work piece is lowered into contact with eccentric means adapted to accurately position said work piece in registry with a machine tool element, means for clamping said work piece in said last-mentioned position, said clamping and oscillating means being interassociated whereby said clamping means can only function when the work piece is in accurate registry with the machine tool element.

3. In a machine tool mechanism, in combination, a sloping platform for supporting a series of substantially cylindrical work pieces with their major axes in parallel arrangement to permit said work pieces to successively roll off said sloping platform, stop means associated with said platform and adapted to retain said cylindrical articles thereon, a second work-receiving platform incorporating hingedly mounted members adjacent said first-mentioned sloping platform, said second-mentioned platform being adapted to receive a work piece on withdrawal of said stop means, said stop means being automatically returnable to engage a second cylindrical work piece, means for withdrawing said second-mentioned platform to permit gravitational lowering of the work piece supported thereby into final position for a work-performing operation thereon, means for clamping said work piece in its final position, and a tool adapted to be advanced along said clamped work piece to effect a working operation thereon.

4. In a machine tool mechanism, in combination, a supporting platform for work pieces, an intermediate trap door platform for receiving a work piece delivered thereto from the first-mentioned platform, said trap door platform being disposed immediately above a work-performing station, eccentric supporting members defining a work-positioning means at said work-performing station, means for lowering said trap door platform to deposit a work piece therefrom on said eccentric supporting members, and means for clamping said work piece thus deposited in position for a working operation to be performed thereon.

5. In a machine tool mechanism of the class described, in combination, work-supporting means adjacent and above a machine tool element, a second work-supporting means adjacent said first-mentioned work-supporting means, said second-mentioned work-supporting means being disposed immediately above a plurality of adjustable eccentrics defining a work-receiving station, a door member between said first- and second-mentioned work-supporting means, said door member and second-mentioned work-supporting means being mechanically interassociated, means for oscillatably withdrawing said second-mentioned work-supporting means whereby a work piece supported thereon is gravitationally lowered into the work-receiving station, actuation of said oscillatable withdrawing means being adapted to close said door member through its interassociation with said second-mentioned work-supporting means, work-clamping means disposed above said work-receiving station, said work-clamping means being adapted to operate when a work piece is positioned at said work-receiving station, and a reciprocatory machine tool adapted to be translated along said work piece in its clamped position at the work-receiving station.

6. A billet-scalping mechanism for scalping the interior tubular surface of a substantially cylindrical cored billet, said mechanism comprising an inclined platform for storing a plurality of substantially cylindrical cored billets, stop means associated with said platform for maintaining said billets upon said inclined platform, a second platform adapted to receive billets discharged from said inclined platform, said second platform being oscillatably supported above a billet-receiving station, a plurality of spaced eccentrics below said second platform, said eccentrics being adjustable to define a billet-receiving station, a lever-operated linkage associated with said stop means, said linkage on actuation of said lever being adapted to downwardly withdraw said stop means to permit a billet to roll onto said second platform, means associated with the linkage and stop means for automatically returning the stop means into stop position following passage of a billet thereover, means for oscillating said second platform to deposit the billet thereon upon the eccentrics defining the billet-receiving station, means for clamping the billet at the billet-receiving station, and a scalping tool in alignment with the interior tubular surface of the clamped billet, said scalping tool being adapted to be fed into the interior of the billet to perform a scalping operation.

7. In a machine tool mechanism, in combination, a work storage, means associated with said work storage for releasing work pieces in successive order, means incorporating hingedly mounted figures for receiving a released work piece at an intermediate work-receiving station, means for actuating the fingers of said receiving means to lower the work piece to a final work-receiving station, means for clamping said work piece at said final work-receiving station, means for advancing a tool along said clamped work piece to perform a working operation thereon, a control member, and means actuated by movement of said control member in one direction for effecting operation of said lowering, clamping, and advancing means sequentially in the order named.

8. In a machine tool mechanism, in combination, a fluid pressure system, a work storage, an intermediate work-receiving station incorporating downwardly oscillatable work-supporting members adjacent said work storage, a work-performing station below said intermediate station, a clamping mechanism disposed in cooperative relationship with said work-performing station, a machine tool element adjacent the work-performing station, means for delivering a work piece from said storage to the work-supporting members at said intermediate station, means for actuating said work-supporting members to transport the work piece supported thereon to the work-performing station, means for actuating said clamping means to secure said work piece at the work-performing station, means for translating said machine tool element relative to said clamped work piece to perform a working operation thereon, reversing control valves in said pressure system for controlling the operation of said work-transporting, work-clamping, and tool-translating means, a control member, means actuated by movement of said member in one direction for operating said control valves in sequence, whereby each of the named means controlled by said valves is sequentially operated in the order named, and means responsive to tool movement for automatically effecting tool retraction independently of actuation of said control member in the other direction.

9. In a machine tool, in combination, a horizontally reciprocable tool, a pair of shafts disposed in parallelism with the tool axis, a plurality of eccentrics on each shaft for supporting a work piece on the upper sides thereof in position to be operated upon by said tool, said shafts being disposed in side by side relation in a common plane, means for simultaneously turning each shaft in opposite directions and through the same angular distance to adjust the position of said eccentrics vertically with respect to the tool axis, and means cooperating with said shaft turning means for holding the same against retrograde movement.

10. A billet-scalping mechanism comprising a horizontally movable tool, a platform for supporting substantially cylindrical billets, said platform being inclined towards the axis of said tool whereby said cylindrical billets are adapted to roll off said platform, stop pins associated with said inclined platform adapted to normally retain said billets thereon, a work-receiving station incorporating hingedly mounted members adjacent said platform and in alignment with the axis of said scalping mechanism, means for actuating said stop pins to automatically release a billet for gravitational delivery to the work-receiving station, said stop pin-actuating means incorporating resilient means for automatically returning said stop pins into work-retaining position, said hingedly mounted members being disposed in opposed relation and inclined downwardly and inwardly with respect to each other to form a substantially V-shaped trough in which the released billet comes to rest, power means for operating said members to lower and raise the billet carried thereby into and out of working position with respect to the path of movement of said tool, and means for supporting and clamping the billet in said working position.

11. In a machine tool, in combination, a horizontally reciprocable tool, a pair of eccentric elements disposed horizontally in side by side relation below the tool axis for supporting a work piece throughout its length in position to be operated upon by said tool, means rotatably supporting said eccentric elements, said eccentric elements being rotatable to adjust the position of a work piece vertically relative to the tool axis to accommodate work pieces of various sizes, means for positively holding each eccentric element in its adjusted position, and clamping means movable downwardly into clamping engagement with a work piece supported on said eccentric elements.

12. In a machine tool mechanism, means for supporting a work piece preparatory to a subsequent work-performing operation thereon, means for temporarily securing said work piece on said supporting means, means for releasing said work piece for movement from the work-supporting means, opposed cantilever members extending toward each other for receiving said work piece and supporting the same in a position intermediate a work-performing station, said releasing means being automatically returnable into work-securing position on delivery of a work piece from the work-supporting means, means for simultaneously swinging said cantilever members downwardly to lower said work piece, a vertically adjustable support for receiving and accurately positioning said work piece at the work-performing station, and a downwardly moving clamp member for clamping said work piece on said vertically adjustable support.

13. A machine tool comprising means for supporting a work piece, means for positively retaining said work piece on said supporting means, means for releasing said work piece for movement of the same from the supporting means, opposed sets of hingedly mounted fingers located in alignment with said supporting means and forming an extension thereof, said sets of fingers forming a V-trough in which said work piece is received and temporarily supported above a final position for a work-performing operation thereon, and means for swinging said sets of fingers in opposite rotative direction to lower said work piece to said final position for the work-performing operation, and to thereafter raise said work piece for discharge movement from said fingers.

14. In a machine tool of the character described, in combination, an axially movable tool, means for advancing and retracting said tool, a work loading table and a work unloading table at opposite sides of the tool axis in laterally spaced relation for movement of said tool therebetween, a plurality of spaced pivotally mounted members associated with each of said tables and extending toward each other to span the gap between said tables when said tool is retracted and having free inner ends, means for releasing work pieces one by one from said loading table for movement along said members to a temporary position above the tool axis, actuating means for said members to swing them downwardly in unison and lower the work piece thereon, vertically adjustable supporting means below said members on which the lowered work piece is deposited and centered in working position with respect to said tool, said supporting means having spaces for movement of said free ends of said members below the work supporting plane thereof, and vertical clamping means movable downwardly with respect to said members to clamp said work piece on said supporting means.

WALTER S. REARICK.
GEORGE E. NIGHTHART.